(12) United States Patent
Cheng et al.

(10) Patent No.: US 10,747,052 B2
(45) Date of Patent: Aug. 18, 2020

(54) BACKLIGHT MODULE AND METHOD FOR MANUFACTURING THE SAME, DISPLAY DEVICE

(71) Applicant: BOE TECHNOLOGY GROUP CO., LTD., Beijing (CN)

(72) Inventors: Hongfei Cheng, Beijing (CN); Yuxin Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/748,281

(22) PCT Filed: Jul. 3, 2017

(86) PCT No.: PCT/CN2017/091449
§ 371 (c)(1),
(2) Date: Jan. 29, 2018

(87) PCT Pub. No.: WO2018/019088
PCT Pub. Date: Feb. 1, 2018

(65) Prior Publication Data
US 2019/0004372 A1    Jan. 3, 2019

(30) Foreign Application Priority Data

Jul. 28, 2016 (CN) .......................... 2016 1 0615954

(51) Int. Cl.
*G02F 1/13357* (2006.01)
*G02F 1/1335* (2006.01)
(Continued)

(52) U.S. Cl.
CPC ..... *G02F 1/133606* (2013.01); *G02B 6/0051* (2013.01); *G02F 1/0107* (2013.01);
(Continued)

(58) Field of Classification Search
CPC ............. G02F 1/133606; G02F 1/0107; G02F 1/133504; G02B 6/0051; G02B 6/0055; G02B 6/005; G02B 6/0063
See application file for complete search history.

(56) References Cited

U.S. PATENT DOCUMENTS

2010/0259825 A1* 10/2010 Yang ........................ G02B 5/02
359/599
2014/0168949 A1* 6/2014 Zhao .................... G02B 6/0041
362/97.3
2015/0378086 A1* 12/2015 Feng .................... G02B 6/0053
349/64

FOREIGN PATENT DOCUMENTS

CN          102537755 A      7/2012
CN          102955193 A      3/2013
(Continued)

OTHER PUBLICATIONS

Search Report for International Application No. PCT/CN2017/091449 dated Sep. 27, 2017.
(Continued)

*Primary Examiner* — Anabel Ton
(74) *Attorney, Agent, or Firm* — Calfee, Halter & Griswold LLP (57) ABSTRACT

A backlight module is disclosed. The backlight module includes a diffuser plate and a light source assembly. The diffuser plate is configured for diffusing light emitted by the light source assembly, and the diffuser plate includes a light entrance surface, the light entrance surface being fitted to a light exit surface of the light source assembly. A manufacturing method of the backlight module and a display device are further disclosed. The display device includes the backlight module.

14 Claims, 5 Drawing Sheets

(51) Int. Cl.
  *F21V 8/00* (2006.01)
  *G02F 1/01* (2006.01)
(52) U.S. Cl.
  CPC .. *G02F 1/133504* (2013.01); *G02F 1/133611* (2013.01); *G02F 2201/503* (2013.01); *G02F 2203/03* (2013.01)

(56) References Cited

FOREIGN PATENT DOCUMENTS

| CN | 103017038 A | 4/2013 |
| CN | 103047584 A | 4/2013 |
| CN | 103244872 A | 8/2013 |
| CN | 105226949 A | 12/2016 |

OTHER PUBLICATIONS

Second Office Action for Chinese Patent Application No. 201610615954.2 dated Jul. 8, 2019.

* cited by examiner

BACKLIGHT MODULE AND METHOD FOR MANUFACTURING THE SAME, DISPLAY DEVICE

The present application is the U.S. national phase entry of PCT/CN2017/091449, with an international filing date of Jul. 3, 2017, which claims the benefit of Chinese Patent Application No. 201610615954.2, filed on Jul. 28, 2016, the entire disclosure of which is incorporated herein by reference.

TECHNICAL FIELD

The present disclosure relates to the field of display technology, particularly to a backlight module and a method for manufacturing the same, as well as a display device.

BACKGROUND

The backlight module is a light emitting structure fixed at the back of the liquid crystal display, and generally consists of a light source assembly, a diffuser plate (or a light guide plate) and an optical film and the like.

In the related art, according to the different arranging positions of the light source assembly, the backlight module can be divided into a side entry backlight module and a direct type backlight module. The light source assembly in the side entry backlight module is arranged at the side surface of the light guide plate, while the light source assembly in the direct type backlight module is arranged at the rear of the diffuser plate.

However, in the related art, in the direct type backlight module, there is a gap between the diffuser plate and the light source assembly, which may result in certain influence to the light entrance efficiency of the diffuser plate.

SUMMARY

In order to solve the problem of a relatively low light entrance efficiency of the diffuser plate in the related art, embodiments of the present disclosure provide a backlight module and a method for manufacturing the same, as well as a display device.

An exemplary aspect of the present disclosure provides a backlight module. The backlight module comprises a diffuser plate and a light source assembly. The diffuser plate is configured for diffusing light emitted by the light source assembly, and the diffuser plate comprises a light entrance surface, the light entrance surface being fitted to a light exit surface of the light source assembly.

In an exemplary embodiment, the diffuser plate and the light source assembly are formed into an integral.

In an exemplary embodiment, the diffuser plate comprises a silicon rubber layer. The silicon rubber layer is provided with scattering particles therein.

In an exemplary embodiment, the silicon rubber layer is formed by mixture of organosilicon pouring sealant, curing agent and scattering particles.

In an exemplary embodiment, in the silicon rubber layer, a weight percentage of the organosilicon pouring sealant is 70% to 89%, a weight percentage of the curing agent is 1% to 10%, and a weight percentage of the scattering particles is 10% to 20%.

In an exemplary embodiment, the scattering particles comprise at least one of organic particles and inorganic particles. A diameter of the scattering particles is 0.01 microns to 50 microns.

In an exemplary embodiment, the light source assembly is a light emitting diode LED or a cold cathode fluorescent lamp CCFL.

Another aspect of the present disclosure provides a manufacturing method of a backlight module, for manufacturing the backlight module as stated above. The method comprises:

forming a diffuser plate using a prefabricated diffuser plate mold;

arranging a light source assembly on a substrate;

enabling a light entrance surface of the diffuser plate to be fitted to a light exit surface of the light source assembly;

wherein the prefabricated diffuser plate mold comprises a baseplate and a back plate arranged around the baseplate, the baseplate is a substrate on which the light source assembly is arranged.

In an exemplary embodiment, the substrate on which the light source assembly is arranged and the diffuser plate are enabled to be formed into an integral.

In an exemplary embodiment, forming a diffuser plate using a prefabricated diffuser plate mold comprises:

forming a silicon rubber layer using the prefabricated diffuser plate mold, the silicon rubber layer being provided with scattering particles therein.

In an exemplary embodiment, forming a silicon rubber layer using the prefabricated diffuser plate mold comprises:

pouring organosilicon pouring sealant, curing agent and scattering particles which are mixed according to a preset proportion into the prefabricated diffuser plate mold;

enabling the organosilicon pouring sealant to be cured so as to form the silicon rubber layer.

In an exemplary embodiment, after enabling the organosilicon pouring sealant to be cured so as to form the silicon rubber layer, the method further comprises:

stripping off the back plate around the prefabricated diffuser plate mold; and performing flattening process to surfaces of the silicon rubber layer.

In an exemplary embodiment, in the silicon rubber layer, a weight percentage of the organosilicon pouring sealant is 70% to 89%, a weight percentage of the curing agent is 1% to 10%, and a weight percentage of the scattering particles is 10% to 20%.

In an exemplary embodiment, the scattering particles comprise at least one of organic particles and inorganic particles. A diameter of the scattering particles is 0.01 microns to 50 microns.

A further aspect of the present disclosure provides a display device. The display device comprises the backlight module as stated above.

In embodiments of the present disclosure, the light entrance surface of the diffuser plate is fitted to the light exit surface of the light source assembly, which effectively reduces the gap between the light source assembly and the diffuser plate, so as to ensure that the light emitted by the light source assembly can be incident into the diffuser plate effectively, thereby improving the light entrance efficiency of the diffuser plate.

BRIEF DESCRIPTION OF THE DRAWINGS

In order to explain the technical solutions in embodiments of the present disclosure more clearly, next, the drawings to be used in the description of the embodiments will be introduced briefly. Apparently, the drawings described below are only some embodiments of the present disclosure. For the ordinary skilled person in the art, other drawings can

DETAILED DESCRIPTION OF THE EMBODIMENTS

In order to enable the objects, the technical solutions and the advantages of the present disclosure to be more explicit, next, the implementations of the present disclosure will be described in more details in conjunction with the drawings.

Figure 1:
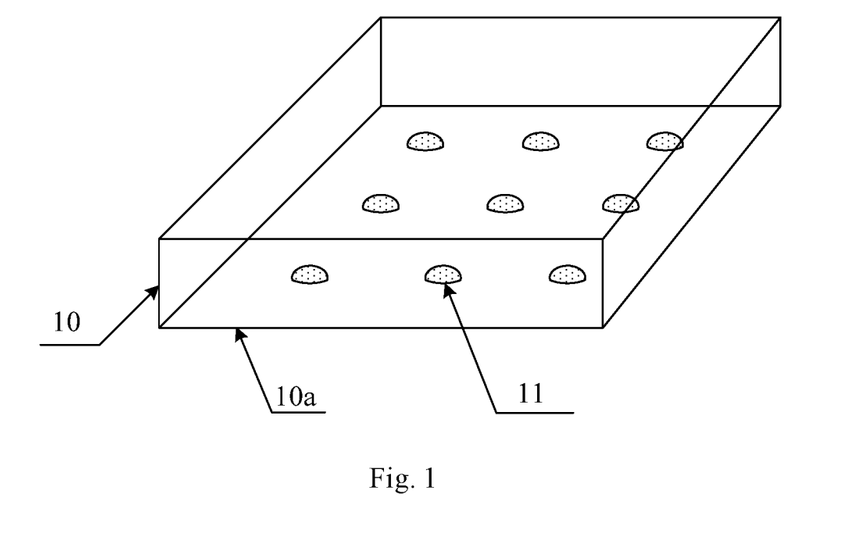
FIG. 1 shows a structural schematic view of a diffuser plate according to an embodiment.

FIG. 1 shows a structural schematic view of a diffuser plate according to an embodiment, as shown in FIG. 1, the diffuser plate 10 is configured for diffusing light emitted by a light source assembly 11.

Referring to FIG. 1, the diffuser plate 10 can comprise a light entrance surface 10a, the light entrance surface 10a being fitted to a light exit surface of the light source assembly 11.

The light entrance surface of the diffuser plate is fitted to the light exit surface of the light source assembly, which effectively reduces the gap between the light source assembly and the diffuser plate, so as to ensure that the light emitted by the light source assembly can be incident into the diffuser plate effectively, thereby improving the light entrance efficiency of the diffuser plate.

Figure 2:
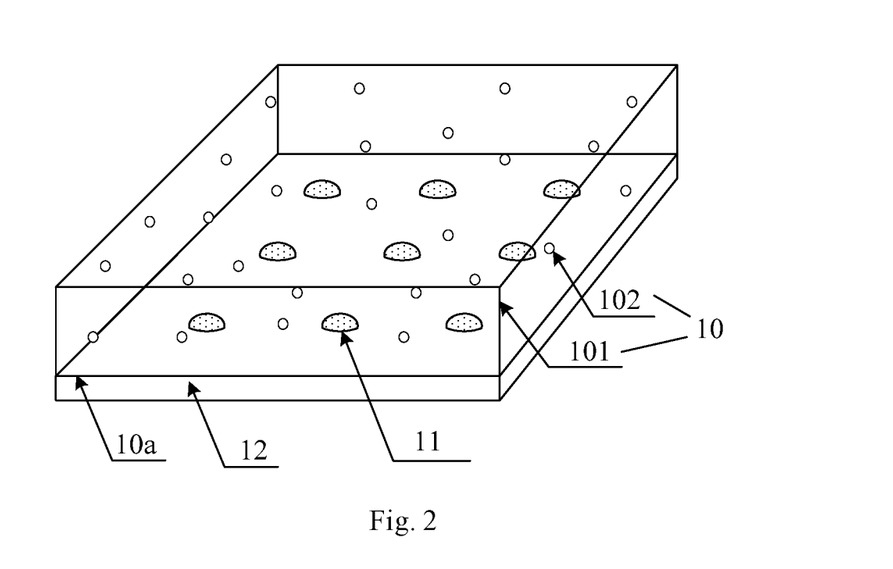
FIG. 2 shows a structural schematic view of another diffuser plate according to an embodiment.

FIG. 2 shows a structural schematic view of another diffuser plate according to an embodiment, as shown in FIG. 2, the diffuser plate 10 and the light source assembly can be formed into an integral. That is to say, referring to FIG. 2, the light source assembly 11 can be arranged on a substrate 12. The diffuser plate 10 can be formed on the substrate 12 on which the light source assembly 11 is arranged, so as to ensure that the light entrance surface 10a of the diffuser plate 10 can be fitted to the light exit surface of the light source assembly 11 effectively.

Referring to FIG. 2, the diffuser plate 10 can comprise a transparent silicon rubber layer 101. The silicon rubber layer 101 can also be provided with scattering particles 102 therein.

Because the refractive indexes of the organosilicon pouring sealant and the scattering particles in the silicon rubber layer are different, the light will pass through two mediums of different refractive indexes continuously when passing through the diffuser plate. Thus, the phenomena of refraction, reflection and scattering are generated, so as to achieve the optical diffusing effect, thereby ensuring that the diffuser plate can provide a uniform surface light source for the display device.

In addition, because the silicon rubber can keep elasticity over a long period of time under the condition of −60° C. to 200° C., and have excellent electrical property and chemical stability, the reliability of the diffuser plate can be guaranteed. Moreover, the silicon rubber is not easily damaged and has certain viscosity, it can play the protection effect to the light source assembly. Further, because the viscosity of the silicon rubber layer is not strong enough, hence, if the light source assembly on the substrate has malfunction or is damaged, the silicon rubber layer can be revealed directly, for the convenience of changing the light source assembly, so as to improve use flexibility of the diffuser plate.

In an embodiment, the silicon rubber layer 10 can be formed by mixture of organosilicon pouring sealant, curing agent and scattering particles. Specifically, in the silicon rubber layer, a weight percentage of the organosilicon pouring sealant is 70% to 89%, a weight percentage of the curing agent is 1% to 10%, and a weight percentage of the scattering particles is 10% to 20%. As an example, in the silicon rubber layer, the weight percentages of the organosilicon pouring sealant, the curing agent and the scattering particles can be 75:5:20.

In actual applications, the organosilicon pouring sealant used in manufacturing the silicon rubber layer can be monocomponent organosilicon pouring sealant or bi-component organosilicon pouring sealant; or, the organosilicon pouring sealant used can be room temperature vulcanized silicone rubber or high temperature vulcanized silicone rubber. The room temperature vulcanized silicone rubber can be divided into three types: monocomponent room temperature vulcanized silicone rubber, bi-component condensed type room temperature vulcanized silicone rubber and bi-component addition type room temperature vulcanized silicone rubber. The embodiment of the present disclosure will not define the type of the organosilicon pouring sealant used in the diffuser plate.

In an embodiment, the scattering particles 102 arranged in the silicon rubber layer 101 can comprise at least one of organic particles and inorganic particles. Specifically, the scattering particles can be at least one of polystyrene particles, polycarbonate particles, polypropylene particles, silica particles, polymethyl methacrylate particles, micro glass beads, titanium dioxide, antimonic oxide, barium sulfate, zinc sulfate and zinc oxide calcium carbonate. Moreover, based on different products in actual applications, the diameter of the scattering particles 102 can be in an optional range of 0.01 microns to 50 microns.

In an embodiment, the light source assembly 11 can be a light emitting diode (LED) or a cold cathode fluorescent lamp (CCFL). The substrate 12 for arranging the light source assembly 11 can be a circuit board.

To sum up, the embodiments of the present disclosure provide a backlight module, comprising a diffuser plate and a light source assembly, wherein the light entrance surface of the diffuser plate is fitted to the light exit surface of the light source assembly, and the diffuser plate and the light source assembly can be formed into an integral. In this way, the gap between the light source assembly and the diffuser plate can be reduced effectively, so as to ensure that the light emitted by the light source assembly can be incident into the diffuser plate effectively, thereby improving the light entrance efficiency of the diffuser plate.

Figure 3:
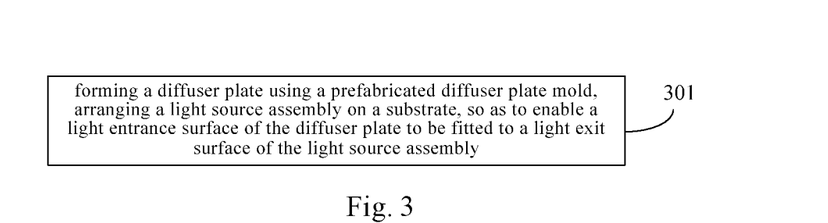
FIG. 3 shows a flow chart of a manufacturing method of a diffuser plate according to an embodiment.

FIG. 3 shows a flow chart of a manufacturing method of a backlight module according to an embodiment. Referring to FIG. 3, the method can comprise:

Step 301: forming a diffuser plate using a prefabricated diffuser plate mold, arranging a light source assembly on a substrate, so as to enable a light entrance surface of the diffuser plate to be fitted to a light exit surface of the light source assembly.

Specifically, the prefabricated diffuser plate mold can comprise a baseplate and a back plate arranged around the baseplate, the baseplate is a substrate on which the light source assembly is arranged.

To sum up, an embodiment of the present disclosure provides a manufacturing method of the backlight module. The baseplate in the diffuser plate mold used in the method is a substrate on which the light source assembly is arranged. The light entrance surface of the diffuser plate in the backlight module manufactured through this method can be fitted to the light exit surface of the light source assembly, which effectively reduces the gap between the light source assembly and the diffuser plate, so as to ensure that the light emitted by the light source assembly can be incident into the diffuser plate effectively, thereby improving the light entrance efficiency of the diffuser plate.

Figure 4:
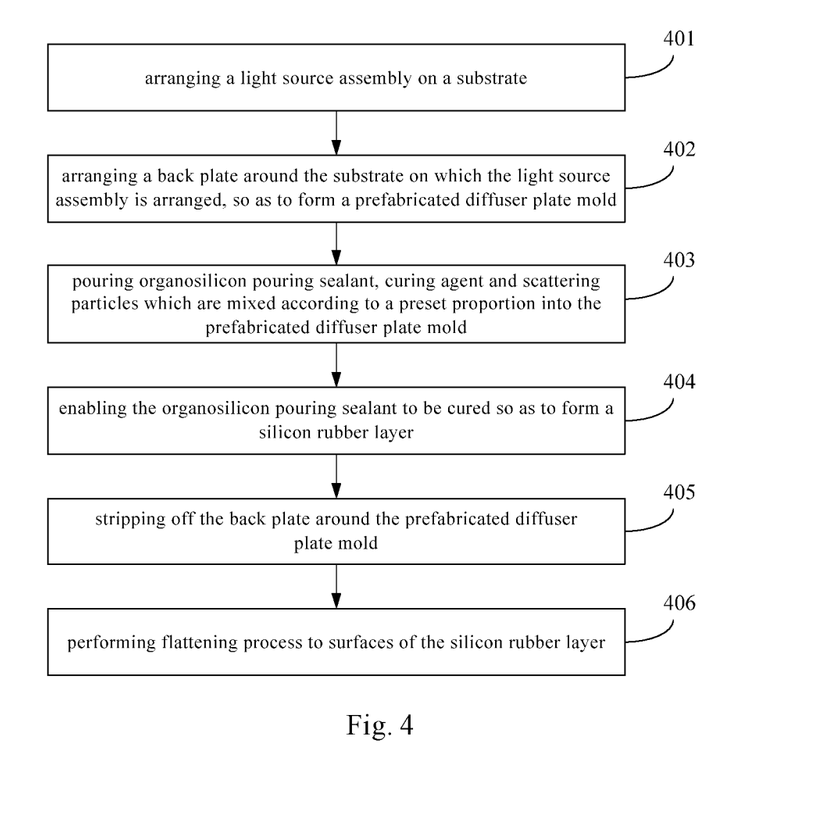
FIG. 4 shows a flow chart of a manufacturing method of another diffuser plate according to an embodiment.

FIG. 4 shows a flow chart of a manufacturing method of another diffuser plate according to an embodiment. As shown in FIG. 4, the method can comprise:

Step 401: arranging a light source assembly on a substrate.

Figure 5:
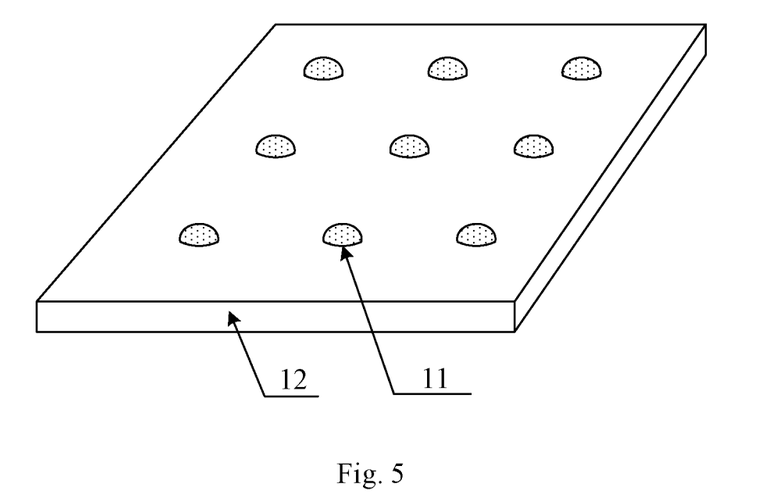
FIG. 5 shows a schematic view of arranging a light source assembly on a substrate according to an embodiment.

In an embodiment, referring to FIG. 5, a plurality of light source assemblies 11 can be arranged on the substrate (e.g., a circuit board) 12 in the form of an array based on the design requirement of the display device. Alternatively, the light source assemblies 11 arranged in an edge area of the substrate can be made relatively concentrated, while the light source assemblies 11 arranged in a middle area of the substrate 12 can be made relatively sparse.

In actual applications, the substrate 12 can be a circuit board. The light source assembly 11 can be an LED or a CCFL. The light source assembly 11 can be welded on the circuit board 12 by soldering tin.

Step 402: arranging a back plate around the substrate on which the light source assembly is arranged, so as to form a prefabricated diffuser plate mold.

Figure 6:
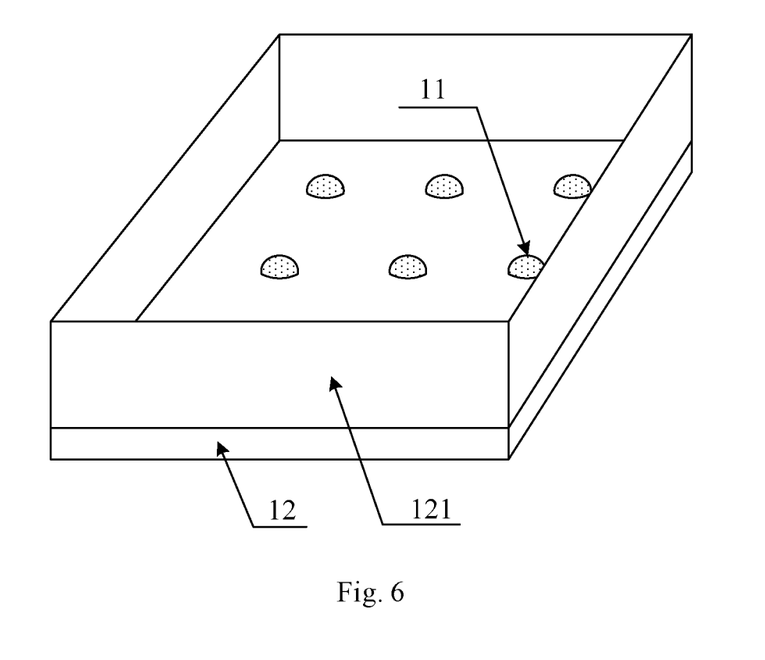
FIG. 6 shows a structural schematic view of a back plate according to an embodiment.
Figures 7, 8:
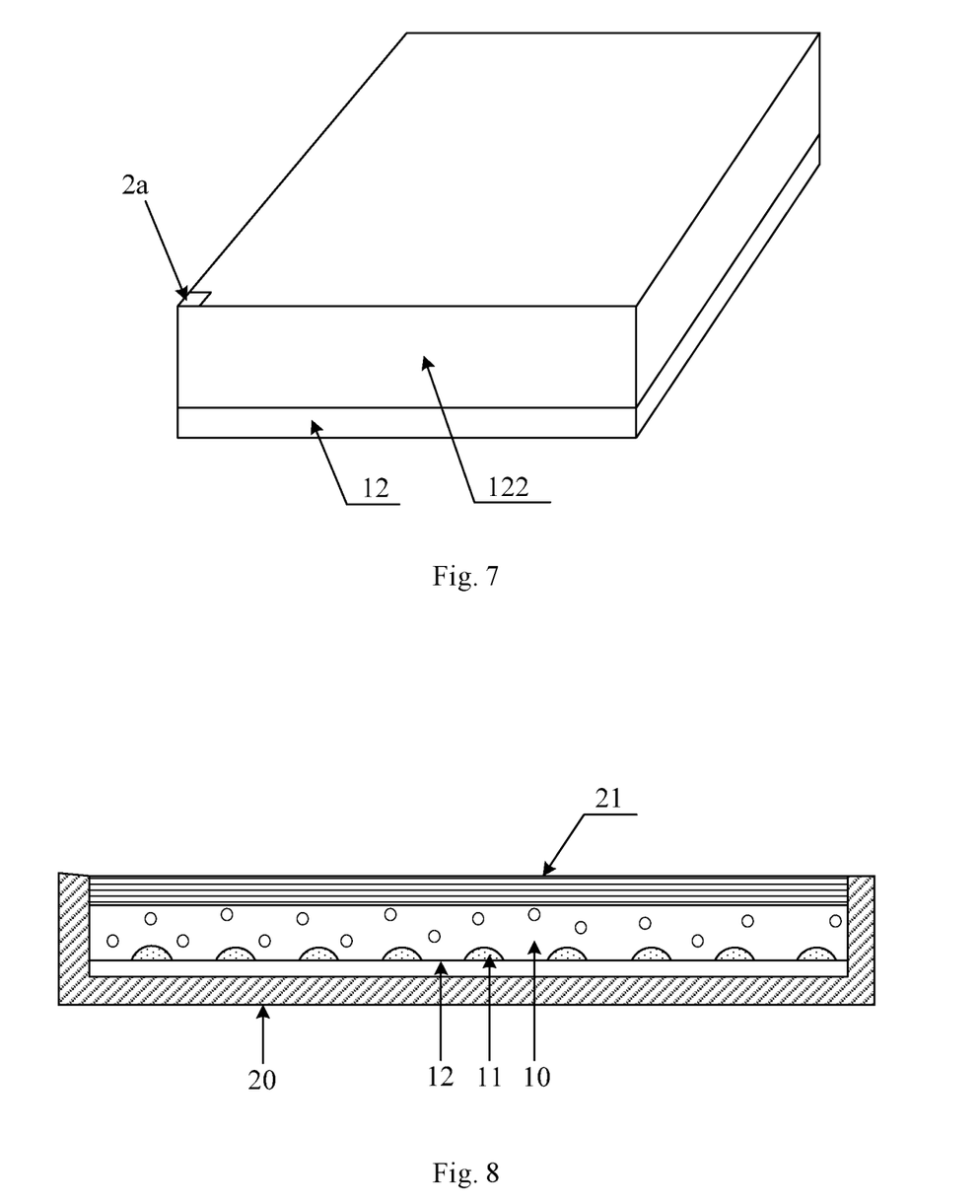
FIG. 7 shows a structural schematic view of another back plate according to an embodiment.
FIG. 8 shows a structural schematic view of a backlight module according to an embodiment.

As shown in FIG. 6, a back plate 121 with the top opened is arranged around the substrate 12. Alternatively, as shown in FIG. 7, a back plate 122 with the top covered can also be arranged around the substrate 12. The cover plate at the top of the back plate 122 can be provided with a hole 2a for pouring the organosilicon pouring sealant. The substrate on which the light source assembly is arranged and the back plate arranged around the substrate can form a mold for manufacturing the diffuser plate.

Step 403: pouring organosilicon pouring sealant, curing agent and scattering particles which are mixed according to a preset proportion into the prefabricated diffuser plate mold.

In an embodiment, when forming the diffuser plate through the prefabricated diffuser plate mold, the weight percentage of the organosilicon pouring sealant can be 70% to 89%, the weight percentage of the curing agent can be 1% to 10%, and the weight percentage of the scattering particles can be 10% to 20%. After the three materials are mixed according to a preset proportion, it can be poured into the prefabricated diffuser plate mold as shown in FIG. 6 directly. Alternatively, as shown in FIG. 7, the mixture can be poured into the prefabricated diffuser plate mold through the hole 2a.

The organosilicon pouring sealant can be monocomponent organosilicon pouring sealant or bi-component organosilicon pouring sealant; or, the organosilicon pouring sealant used can also be room temperature vulcanized silicone rubber or high temperature vulcanized silicone rubber. The scattering particles can comprise at least one of organic particles and inorganic particles, and the diameter of the scattering particles 102 can be in an optional range of 0.01 microns to 50 microns.

In actual applications, before forming the diffuser plate, the organosilicon pouring sealant, the curing agent and the scattering particles can be sufficiently mixed according to the weight ratio of 75:5:20, the mixture is stirred slightly so as to reduce air in the mixture. Before pouring, the mixture can be placed for 5 minutes, so as to remove the air in the mixture. If there are still air bubbles in the mixture, vacuum defoaming process can be performed to the mixture, so as to pour it into the diffuser plate mold after the air bubbles in the mixture are eliminated completely.

Step 404: enabling the organosilicon pouring sealant to be cured so as to form a silicon rubber layer.

In an embodiment, because the curing agent is mixed in the mixture, the organosilicon pouring sealant can be cured under the condition of room temperature (e.g., 25° C.). In addition, the mixture can also be heated to accelerate the curing speed of the organosilicon pouring sealant. When the organosilicon pouring sealant is converted into solid elastomer completely, the curing reaction is accomplished. The silicon rubber layer formed by the organosilicon pouring sealant, the curing agent and the scattering particles is namely the diffuser plate.

Step 405: stripping off the back plate around the prefabricated diffuser plate mold.

Exemplarily, when the organosilicon pouring sealant is cured, the back plate 121 or 122 around the substrate 12 can be stripped off. The diffuser plate after the back plate is stripped off may be as shown in FIG. 2, here, the diffuser plate 10 and the light source assembly 11 are formed into an integral.

Step 406: performing flattening process to surfaces of the silicon rubber layer.

After the back plate is stripped off, flattening process also has to be performed to surfaces of the silicon rubber layer, so as to enable the surfaces of the silicon rubber layer to keep level.

To sum up, an embodiment of the present disclosure provides a manufacturing method of a backlight module. The baseplate in the diffuser plate mold used in the method is a substrate on which the light source assembly is arranged, hence, the light entrance surface of the diffuser plate manufactured through this method can be fitted to the light exit surface of the light source assembly, and the diffuser plate and the light source assembly can be formed into an integral. Hence, the gap between the light source assembly and the diffuser plate is reduced effectively, so as to ensure that the light emitted by the light source assembly can be incident into the diffuser plate effectively, thereby improving the light entrance efficiency of the diffuser plate.

FIG. 8 shows a structural schematic view of a backlight module according to an embodiment. As shown in FIG. 8, the backlight module can comprise a diffuser plate 10 and a light source assembly 11. The backlight module can further comprise a backboard 20 and an optical film 21. The diffuser plate 10 is arranged in the backboard 20, and the optical film 21 is arranged on the light exit surface of the diffuser plate 10. The light entrance surface of the diffuser plate 10 is fitted to the light exit surface of the light source assembly 11. The light source assembly 11 can be arranged on the substrate 12, the substrate 12 can be a circuit board.

Figure 9:
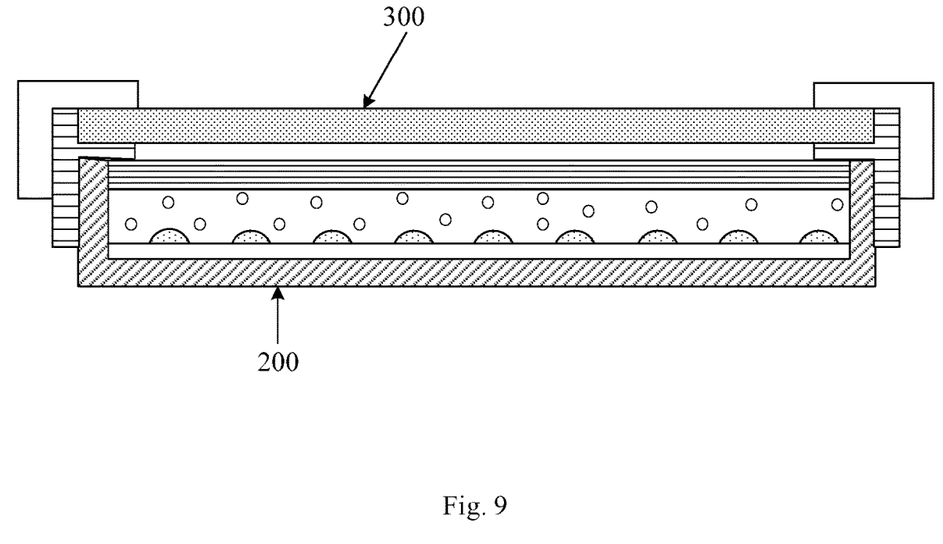
FIG. 9 shows a structural schematic view of a display device according to an embodiment.

FIG. 9 shows a structural schematic view of a display device according to an embodiment. The display device can comprise a backlight module 200 and a display panel 300, wherein the backlight module 200 can be the backlight module as shown in FIG. 8.

What are stated above are only embodiments of the present disclosure, which are not used for limiting the present disclosure. Any amendment, equivalent replacement, and improvement and the like made within the spirit and the principle of the present disclosure should be encompassed within the protection scope of the present disclosure.

The invention claimed is:

1. A backlight module, comprising a diffuser plate and a light source assembly, wherein,
   the diffuser plate is configured for diffusing light emitted by the light source assembly;
   the diffuser plate comprises a light entrance surface, the light entrance surface being fitted to a light exit surface of the light source assembly;
   the diffuser plate and the light source assembly are formed integrally;
   wherein the diffuser plate comprises a silicon rubber layer; and
   the silicon rubber layer is provided with scattering particles therein.

2. The backlight module according to claim 1, wherein, the silicon rubber layer is formed by mixture of organosilicon pouring sealant, curing agent and scattering particles.

3. The backlight module according to claim 2, wherein, in the silicon rubber layer, a weight percentage of the organosilicon pouring sealant is 70% to 89%, a weight percentage of the curing agent is 1% to 10%, and a weight percentage of the scattering particles is 10% to 20%.

4. The backlight module according to claim 1, wherein, the scattering particles comprise at least one of organic particles and inorganic particles;
   a diameter of the scattering particles is 0.01 microns to 50 microns.

5. The backlight module according to claim 1, wherein, the light source assembly is a light emitting diode LED or a cold cathode fluorescent lamp CCFL.

6. A display device, comprising the backlight module according to claim 1.

7. The display device according to claim 6, wherein, the silicon rubber layer is formed by mixture of organosilicon pouring sealant, curing agent and scattering particles.

8. The display device according to claim 7, wherein, in the silicon rubber layer, a weight percentage of the organosilicon pouring sealant is 70% to 89%, a weight percentage of the curing agent is 1% to 10%, and a weight percentage of the scattering particles is 10% to 20%.

9. The display device according to claim 6, wherein, the scattering particles comprise at least one of organic particles and inorganic particles;
   a diameter of the scattering particles is 0.01 microns to 50 microns.

10. A backlight module, comprising a diffuser plate and a light source assembly, wherein,
    the diffuser plate is configured for diffusing light emitted by the light source assembly;
    the diffuser plate comprises a light entrance surface, the light entrance surface being fitted to a light exit surface of the light source assembly;
    the diffuser plate comprises a silicon rubber layer; and
    the silicon rubber layer is provided with scattering particles therein.

11. The backlight module according to claim 10, wherein, the silicon rubber layer is formed by mixture of organosilicon pouring sealant, curing agent and scattering particles.

12. The backlight module according to claim 11, wherein, in the silicon rubber layer, a weight percentage of the organosilicon pouring sealant is 70% to 89%, a weight percentage of the curing agent is 1% to 10%, and a weight percentage of the scattering particles is 10% to 20%.

13. The backlight module according to claim 10, wherein, the scattering particles comprise at least one of organic particles and inorganic particles;
    a diameter of the scattering particles is 0.01 microns to 50 microns.

14. A display device, comprising the backlight module according to claim 10.

* * * * *